US010330050B2

(12) United States Patent
Okada et al.

(10) Patent No.: US 10,330,050 B2
(45) Date of Patent: Jun. 25, 2019

(54) FUEL INJECTION DEVICE FOR GAS TURBINE

(71) Applicant: KAWASAKI JUKOGYO KABUSHIKI KAISHA, Kobe-shi, Hyogo (JP)

(72) Inventors: Kunio Okada, Kakogawa (JP); Atsushi Horikawa, Akashi (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 535 days.

(21) Appl. No.: 15/051,876

(22) Filed: Feb. 24, 2016

(65) Prior Publication Data

US 2016/0169160 A1    Jun. 16, 2016

Related U.S. Application Data

(63) Continuation of application No. PCT/JP2014/072605, filed on Aug. 28, 2014.

(30) Foreign Application Priority Data

Oct. 11, 2013   (JP) .............................. 2013-213506

(51) Int. Cl.
*F23R 3/28* (2006.01)
*F23R 3/14* (2006.01)
(Continued)

(52) U.S. Cl.
CPC ......... *F02M 25/028* (2013.01); *F01K 21/047* (2013.01); *F02C 3/30* (2013.01);
(Continued)

(58) Field of Classification Search
CPC ...... F23R 3/16; F23R 3/22; F23R 3/28; F23R 3/283; F23R 3/286; F23R 3/30; F23D 14/62
See application file for complete search history.

(56) References Cited

U.S. PATENT DOCUMENTS 2,404,335 A * 7/1946 Whittle .................... F23R 3/14
                                                    431/216
4,041,699 A * 8/1977 Scheib ...................... F02C 7/16
                                                    60/39.511
(Continued)

FOREIGN PATENT DOCUMENTS

JP        06-066156 A      3/1994
JP        07-269865 A     10/1995
(Continued)

OTHER PUBLICATIONS

Communication dated Nov. 2, 2016, issued by the Canadian Intellectual Property Office in corresponding Canadian Application No. 2921892.
(Continued)

*Primary Examiner* — Todd E Manahan
*Assistant Examiner* — Eric Linderman
(74) *Attorney, Agent, or Firm* — Sughrue Mion, PLLC

(57) ABSTRACT

A fuel injection device, for a gas turbine, which enhances uniform distribution in concentration of fuel gas and water vapor in a combustion chamber with simple structure and at low cost to effectively reduce NOx, is provided. The fuel injection device with a fuel nozzle to mix fuel gas and water vapor and inject the fuel gas and water vapor into a combustion chamber, includes: a nozzle housing having a mixing chamber thereinside; a first introduction passage to introduce the fuel gas into the mixing chamber from outside of the nozzle housing; and a second introduction passage to introduce the water vapor into the mixing chamber from an
(Continued)

outside of the nozzle housing; and a plurality of reverse passages communicating with a downstream end of the mixing chamber and configured to allow for a plurality of reverses of flow of mixed gas from the mixing chamber.

8 Claims, 6 Drawing Sheets

(51) Int. Cl.
| | |
|---|---|
| *F02C 7/22* | (2006.01) |
| *F02C 3/30* | (2006.01) |
| *F02M 25/028* | (2006.01) |
| *F23R 3/32* | (2006.01) |
| *F01K 21/04* | (2006.01) |
| *F23L 7/00* | (2006.01) |
| *F02M 9/00* | (2006.01) |
| *F23D 14/62* | (2006.01) |
| *F23R 3/22* | (2006.01) |
| *F23R 3/16* | (2006.01) |

(52) U.S. Cl.
CPC ............... *F02C 7/22* (2013.01); *F02M 9/00* (2013.01); *F23L 7/005* (2013.01); *F23R 3/28* (2013.01); *F23R 3/32* (2013.01); *F23C 2900/9901* (2013.01); *F23D 14/62* (2013.01); *F23R 3/16* (2013.01); *F23R 3/22* (2013.01); *F23R 3/286* (2013.01)

(56) References Cited

U.S. PATENT DOCUMENTS

| | | | | | |
|---|---|---|---|---|---|
| 4,298,338 | A | * | 11/1981 | Babington | F23C 7/02 239/433 |
| 4,549,402 | A | * | 10/1985 | Saintsbury | F23R 3/28 60/738 |
| 4,928,478 | A | * | 5/1990 | Maslak | F01K 21/047 60/39.3 |
| 4,986,068 | A | * | 1/1991 | Lee | F02K 7/10 60/740 |
| 5,054,279 | A | * | 10/1991 | Hines | F01K 21/047 60/39.5 |
| 5,305,608 | A | * | 4/1994 | Loving | F23R 3/005 431/353 |
| 5,377,483 | A | * | 1/1995 | Mowill | F02C 9/50 60/776 |
| 5,617,716 | A | * | 4/1997 | Schreiber | F02C 3/30 60/39.182 |
| 5,657,631 | A | * | 8/1997 | Androsov | F23D 11/402 239/403 |
| 6,003,299 | A | * | 12/1999 | Idleman | F23R 3/26 60/39.23 |
| 6,357,237 | B1 | * | 3/2002 | Candy | F23D 11/36 60/737 |
| 6,430,933 | B1 | * | 8/2002 | Keller | F23C 9/006 431/115 |
| 6,523,350 | B1 | * | 2/2003 | Mancini | F23R 3/28 123/468 |
| 6,715,295 | B2 | * | 4/2004 | Gadde | F02C 3/30 60/39.3 |
| 9,765,972 | B2 | * | 9/2017 | Zink | F23R 3/28 |
| 9,970,356 | B2 | * | 5/2018 | Okazaki | F02C 7/22 |
| 2007/0277528 | A1 | * | 12/2007 | Homitz | F23D 14/08 60/737 |
| 2008/0041059 | A1 | * | 2/2008 | Teets | F23D 14/66 60/737 |
| 2009/0100820 | A1 | * | 4/2009 | Prabhu | F02C 3/22 60/39.23 |
| 2010/0146984 | A1 | | 6/2010 | Carroni et al. | |
| 2010/0175386 | A1 | * | 7/2010 | Haynes | F02C 3/30 60/780 |
| 2010/0263383 | A1 | * | 10/2010 | York | F23R 3/14 60/748 |
| 2011/0000214 | A1 | * | 1/2011 | Helmick | F23D 14/76 60/734 |
| 2011/0023493 | A1 | * | 2/2011 | Jain | F23R 3/286 60/747 |
| 2011/0197566 | A1 | * | 8/2011 | Velkur | B01J 8/0221 60/39.12 |
| 2012/0148925 | A1 | * | 6/2012 | Grannell | C01B 3/047 429/408 |
| 2012/0248217 | A1 | * | 10/2012 | Bunker | F23R 3/14 239/5 |
| 2013/0097991 | A1 | * | 4/2013 | Zhang | F23K 5/06 60/39.59 |
| 2013/0192237 | A1 | * | 8/2013 | Oskam | F23R 3/286 60/772 |
| 2014/0060071 | A1 | * | 3/2014 | Nilsson | F23D 11/28 60/776 |
| 2014/0283498 | A1 | * | 9/2014 | Horikawa | F23L 7/002 60/39.19 |
| 2015/0321155 | A1 | * | 11/2015 | Kim | C10L 3/06 366/148 |
| 2015/0361895 | A1 | * | 12/2015 | Okazaki | F02C 7/22 60/737 |
| 2016/0169160 | A1 | | 6/2016 | Okada et al. | |
| 2016/0169523 | A1 | * | 6/2016 | Okada | F02C 3/30 60/740 |
| 2016/0215982 | A1 | * | 7/2016 | Pfeffer | B01F 5/0401 |
| 2016/0313007 | A1 | * | 10/2016 | Martini | F23R 3/04 |
| 2017/0138268 | A1 | * | 5/2017 | Nakahara | F02C 7/22 |
| 2017/0321609 | A1 | * | 11/2017 | Ogata | F02C 7/22 |

FOREIGN PATENT DOCUMENTS

| | | |
|---|---|---|
| JP | 10-196401 A | 7/1998 |
| JP | 2000-002420 A | 1/2000 |
| JP | 2001-041454 A | 2/2001 |
| JP | 2002038970 A | 2/2002 |
| JP | 2003-279042 A | 10/2003 |
| JP | 2010-216669 A | 9/2010 |
| JP | 2010-535303 A | 11/2010 |
| JP | 2012-159212 A | 8/2012 |
| WO | 2015053004 A1 | 4/2015 |

OTHER PUBLICATIONS

International Preliminary Report on Patentability for PCT/JP2014/072605 dated Apr. 21, 2016.
Communication dated Aug. 19, 2016, issued by the Australian Patent Office in corresponding Australian Application No. 2014333238.
International Search Report for PCT/JP2014/072605 dated Oct. 28, 2016 [PCT/ISA/210].
Written Opinion for PCT/JP2014/072605 dated Oct. 28, 2016 [PCT/ISA/237].
Communication dated Aug. 22, 2017 from the Japanese Patent Office in counterpart Application No. 2013-213506.

* cited by examiner

△ : COMBUSTION OF NATURAL GAS AND WATER VAPOR WITH CONVENTIONAL DEVICE

▲ : COMBUSTION OF H$_2$ GAS AND WATER VAPOR WITH CONVENTIONAL DEVICE

○ : COMBUSTION OF NATURAL GAS AND WATER VAPOR WITH PRESENT INVENTION DEVICE

● : COMBUSTION OF H$_2$ GAS AND WATER VAPOR WITH PRESENT INVENTION DEVICE

FUEL INJECTION DEVICE FOR GAS TURBINE

CROSS REFERENCE TO THE RELATED APPLICATION

This application is a continuation application, under 35 U.S.C. § 111(a), of international application No. PCT/JP2014/072605, filed Aug. 28, 2014, which claims priority to Japanese patent application No. 2013-213506, filed Oct. 11, 2013, the disclosure of which are incorporated by reference in their entirety into this application.

BACKGROUND OF THE INVENTION

Field of the Invention

The present invention relates to fuel injection devices, for gas turbines, which allow NOx in exhaust gas to be efficiently reduced by premixing fuel gas such as hydrogen gas, and water vapor so as to make a distribution in concentration thereof uniform before injection thereof into combustors.

Description of Related Art

In recent years, for gas turbine systems, a technique of injecting fuel and water or water vapor into a combustor in order to reduce generation of NOx in exhaust gas and enhance efficiency of the system, has been developed (for example, Patent Document 1 to 3).

RELATED DOCUMENT

Patent Document

[Patent Document 1] JP Laid-open Patent Publication No. H06-66156
[Patent Document 2] JP Laid-open Patent Publication No. 2010-535303
[Patent Document 3] JP Laid-open Patent Publication No. H10-196401

SUMMARY OF THE INVENTION

However, in the fuel injection device disclosed in Patent Document 1, liquid fuel, water vapor, and gas fuel from the liquid fuel nozzle, the water vapor nozzle, and the gas fuel nozzle, are mixed in the combustion chamber only after the liquid fuel, the water vapor, and the gas fuel are injected into the combustor, and a distribution in concentration of the fuels and the water vapor in the combustion chamber thus becomes non-uniform, so that reduction of NOx contained in exhaust gas after combustion is insufficient. The fuel injection device disclosed in Patent Document 2 is provided in order to reduce a flame temperature by injection of hydrogen fuel having fine water droplets mixed therein. However, a specific configuration therefor is not disclosed, and thus effective reduction of NOx contained in exhaust gas after combustion cannot be expected. For the fuel injection device disclosed in Patent Document 3, a technique is disclosed in which liquid fuel and water vapor are premixed and then supplied to the nozzle, to reduce fuel injection pressure and thus reduce emission of NOx. However, since liquid fuel is used as fuel, it is difficult to obtain a uniform distribution in concentration of the liquid fuel and the water vapor in the combustion chamber. Therefore, substantial reduction of NOx is also difficult.

An object of the present invention is to provide a fuel injection device, for a gas turbine, which allows a distribution in concentration of fuel gas and water vapor in a combustion chamber to be made uniform with a simple structure and at low cost to effectively reduce generation of NOx.

In order to attain the aforementioned object, a fuel injection device for a gas turbine according to the present invention is a fuel injection device, for a gas turbine, that mixes fuel gas and water vapor and injects the fuel gas and the water vapor into a combustion chamber, and the fuel injection device includes: a nozzle housing having a mixing chamber thereinside; a first introduction passage configured to introduce the fuel gas into the mixing chamber from an outside of the nozzle housing; a second introduction passage configured to introduce the water vapor into the mixing chamber from an outside of the nozzle housing; and a plurality of reverse passages communicating with a downstream end of the mixing chamber and configured allow for a plurality of reverses of flow of mixed gas from the mixing chamber. In the description herein, the term "reverse" means that the direction of the flow is deflected by 180°.

In this configuration, the fuel gas and the water vapor are introduced into the mixing chamber of the nozzle housing to generate mixed gas, and, while the flow of the fuel gas and the water vapor is repeatedly reversed through a plurality of reverse passages a plurality of times, the fuel gas and the water vapor are further mixed in the mixing chamber over a longer travel distance for a longer time period. As a result, the fuel gas and the water vapor are sufficiently premixed, and a distribution in concentration of the fuel gas and the water vapor can be made uniform, as compared to a case where mixing is performed without using a reverse passage. The fuel gas and the water vapor are injected into the combustion chamber and combustion thereof is caused in a state where a distribution in concentration of the fuel gas and the water vapor is made uniform, thereby achieving effective reduction of generation of NOx. Further, the fuel and vapor are premixed and then injected, whereby vapor can be effectively injected into combustion region, so that an amount of water vapor to be used can be reduced. Therefore, efficiency is enhanced in the entirety of the gas turbine system. Further, additional equipment such as a mixer for premixing need not be provided, and the fuel injection device also has a simple structure, whereby the device can be produced at low cost.

The fuel injection device according to the present invention may include a first reverse passage configured to reverse flow of the mixed gas toward an upstream side of the mixing chamber, and a second reverse passage configured to reverse flow of the mixed gas from the first reverse passage toward a downstream side of the mixing chamber. In this configuration, the first reverse passage and the second reverse passage extend in the upstream-downstream direction of the mixing chamber and are overlaid on each other. Therefore the structure can be made compact.

Specifically, the first reverse passage may be disposed radially outward of the mixing chamber, and the second reverse passage may be disposed radially outward of the first reverse passage. In this configuration, the first reverse passage and the second reverse passage are formed radially outward of the mixing chamber so as to be overlaid on each other. Therefore, the structure is made further compact.

The fuel injection device according to the present invention may include a gas injection portion provided at an end portion of the nozzle housing and configured to inject, into the combustion chamber, the mixed gas from a reverse passage arranged at a most downstream side, and a mixed gas collection chamber formed between the gas injection portion and the reverse passage arranged at the most downstream side. In this configuration, the mixed gas from the reverse passage arranged at the most downstream side is temporarily stored in the mixed gas collection chamber, so that the mixed gas has its speed reduced in the mixed gas collection chamber, to further promote mixing of the fuel gas and the water vapor.

In the fuel injection device according to the present invention, the mixed gas collection chamber may be disposed radially inward of a downstream end portion of the reverse passage arranged at the most downstream side. In this configuration, a distance, to the mixed gas collection chamber on the radially inner side, from the reverse passage arranged at the most downstream side and on the radially outer side, is increased, whereby the mixed gas is mixed over a longer travel distance for a longer time period. Thus, a distribution in concentration of the fuel gas and the water vapor can be effectively made uniform.

In the fuel injection device according to the present invention, the gas injection portion may include: a gas injection hole to inject the mixed gas into the combustion chamber, an air injection hole to inject air into the combustion chamber; and a nozzle block, the nozzle block and the nozzle housing may cooperatively form therebetween an intermediate gas header chamber communicating with a downstream side of the mixed gas collection chamber, the nozzle block may have: an end gas header chamber communicating with a downstream side of the intermediate gas header chamber through a plurality of communication paths; a pin member disposed on an axis of the nozzle housing; and a cooling passage configured to supply cooling air to an outer surface of the pin member, and the air injection hole may be configured to inject air, which has cooled the pin member, into the combustion chamber. In this configuration, the pin member that forms an air passage in the nozzle block can be cooled by the cooling air, to prevent thermal damage of the pin member heated by flames in the combustion chamber.

In the fuel injection device according to the present invention, one of the first introduction passage and the second introduction passage may be arranged so as to introduce one of the fuel gas and the water vapor from an outer circumference of the nozzle housing in a radial direction of the mixing chamber, and the other of the first introduction passage and the second introduction passage may be arranged so as to introduce the other of the fuel gas and the water vapor into the mixing chamber in an axial direction of the nozzle housing. In this configuration, the fuel gas and the water vapor are introduced into the mixing chamber so as to form an angle of 90°, and the fuel gas and the water vapor thus collide with each other in the mixing chamber. Therefore, even before the fuel gas and the water vapor reach the reverse passage, the fuel gas and the water vapor are effectively mixed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
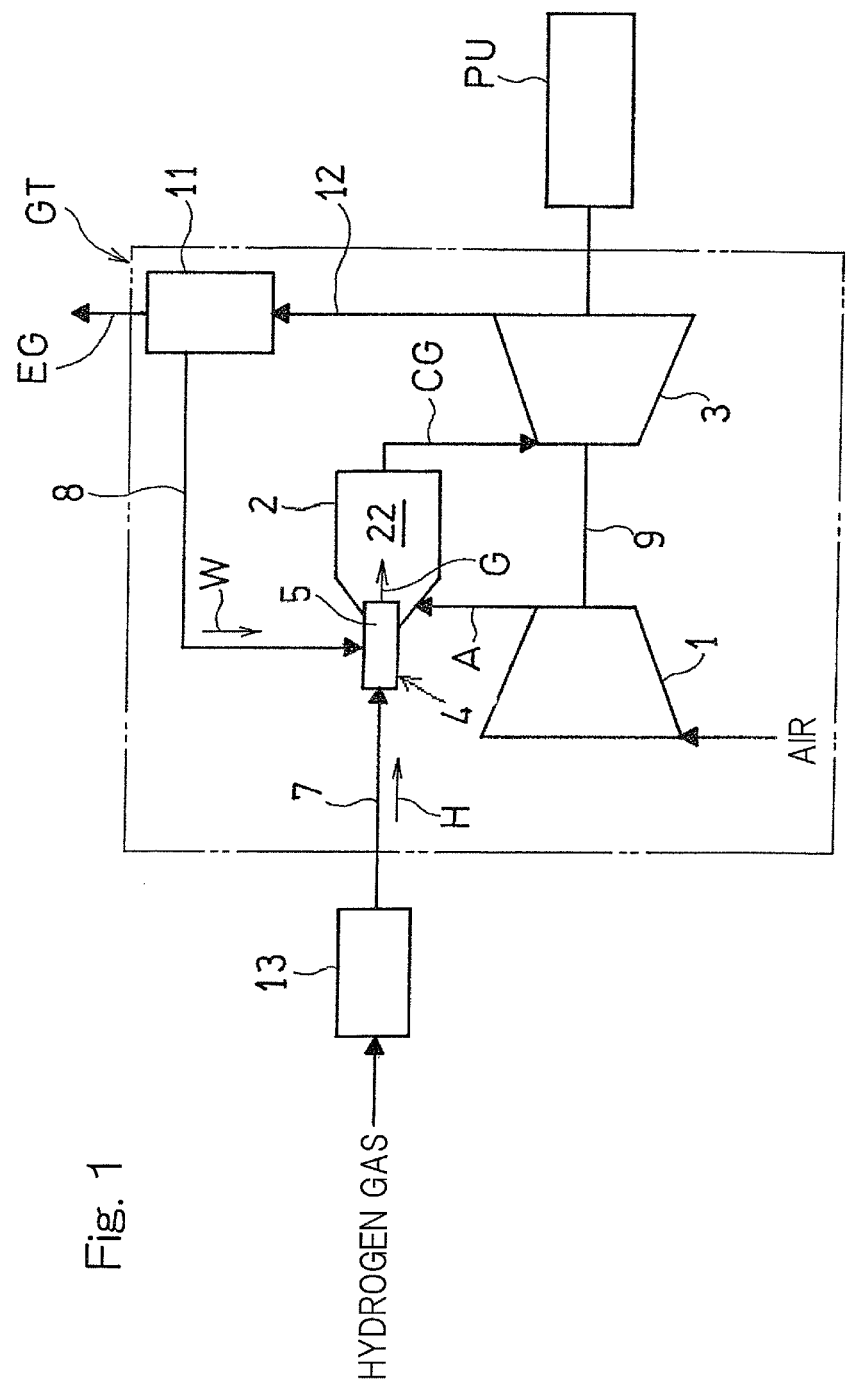
FIG. 1 is a schematic diagram illustrating a gas turbine system to which a fuel injection device according to an embodiment of the present invention is applied.

An embodiment of the present invention will be described below with reference to the drawings. FIG. 1 illustrates a gas turbine system to which a fuel injection device according to an embodiment of the present invention is applied. A gas turbine system GT shown in FIG. 1 includes: a compressor 1 configured to compress air A; a combustor 2; a turbine 3; and a boiler 11. The boiler 11 generates water vapor by using an exhaust gas EG discharged from the turbine 3 as a heat source.

A fuel injection device 4 is provided at a head portion of the combustor 2. The fuel injection device 4 includes a fuel nozzle 5 having a base end portion on the upstream side thereof connected with a first introduction passage 7 through which fuel gas such as hydrogen gas H is supplied, and a second introduction passage 8 through which water vapor W from the boiler 11 is supplied. The water vapor W is supplied in order to reduce a flame temperature which is locally high in a combustion chamber 22 of the combustor 2 for thereby suppressing generation of NOx. In the fuel injection device 4, the hydrogen gas H supplied through the first introduction passage 7 and the water vapor W supplied through the second introduction passage 8 are premixed to generate mixed gas G. Hydrogen gas is the most favorable as the fuel gas H. However, instead thereof, natural gas may be used for the fuel gas.

Combustion of the compressed air A supplied from the compressor 1 and the mixed gas G supplied from the fuel injection device 4 is caused in the combustion chamber 22 to generate high temperature, high pressure combustion gas CG. The generated combustion gas CG is supplied to the turbine 3 to drive the turbine 3. The compressor 1 is driven through a rotation shaft 9 by the turbine 3, and a load such as a generator PU is driven by the turbine 3.

The second introduction passage 8 has an upstream side end connected to the boiler 11. The boiler 11 is disposed on an exhaust passage 12 extending from the turbine 3, and waste heat recovered from the exhaust gas EG is utilized as a heat source for generating vapor in the boiler 11. The exhaust gas EG that has passed through the boiler 11 passes through a silencer (not shown), and is then discharged to the outside. Water is supplied to the boiler 11 from an external water supply (not shown).

The first introduction passage 7 has an upstream side end connected to a gas compressor device 13. The gas compressor device 13 compressed low pressure hydrogen gas that is supplied from a fuel supply (not shown) such as a hydrogen gas cylinder to generate high pressure hydrogen gas H, and subsequently the hydrogen gas H is supplied to the fuel injection device 4.

Figure 2:
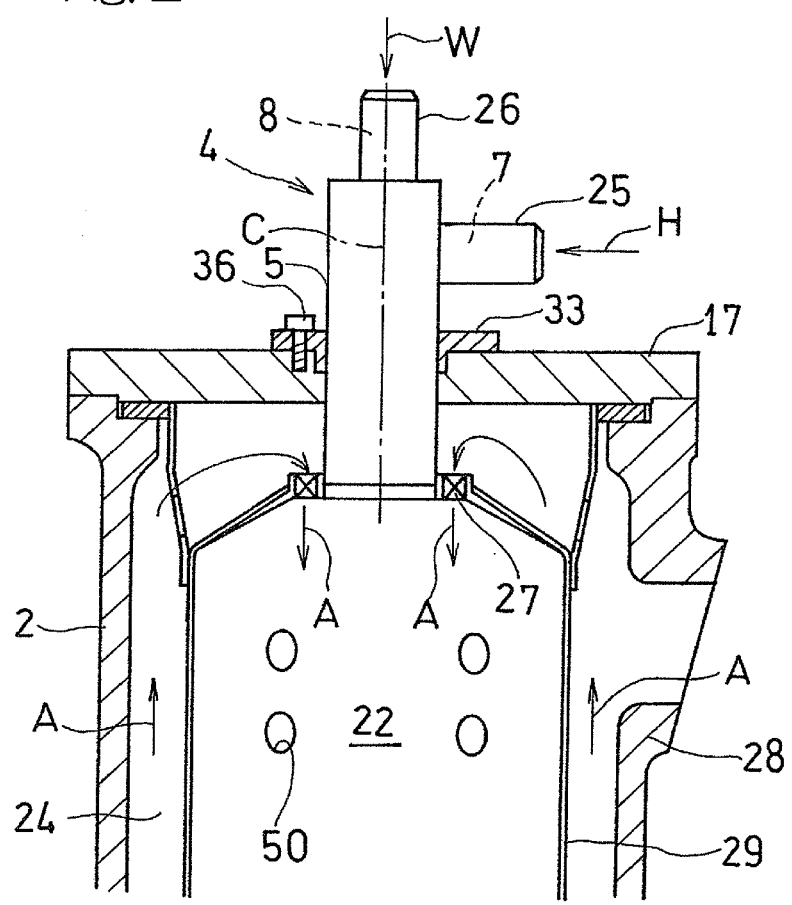
FIG. 2 is a longitudinal cross-sectional view of a main portion of a combustor having the fuel injection device.

FIG. 2 shows the head portion of the combustor 2. As shown in FIG. 2, the combustor 2 is of a single-can type, and includes, in a tubular housing 28, a combustion tube 29 that forms the combustion chamber 22. An end portion of the housing 28 is covered by a cover 17. The fuel injection device 4 is disposed so as to be concentric with the combustion tube 29, and is attached to the cover 17. The fuel nozzle 5 has, on the downstream side, an end portion which penetrates through the cover 17 and faces the combustion chamber 22. To the base end portion, on the upstream side, of the fuel nozzle 5, a first introduction tube 25 that forms the first introduction passage 7 for supplying the fuel gas H is connected in the radial direction of the fuel injection device 4, and a second introduction tube 26 that forms the second introduction passage 8 for supplying the water vapor W is connected along the axis C of the fuel injection device 4 so as to be concentric therewith. Accordingly, the first introduction tube 25 and the second introduction tube 26 form an introduction angle of substantially 90°.

An air passage 24, through which the compressed air A compressed by the compressor 1 (FIG. 1) is sent into the combustion chamber 22, is formed on the outer periphery of the combustion tube 29. A portion of the compressed air A, which flows through the air passage 24, is introduced into the combustion chamber 22 through a swirler 27 disposed on the inner circumference of the air passage 24 and at the end portion of the combustion tube 29 so as to be swirled as indicated by the arrows. The other portion of the compressed air A is introduced into the combustion chamber 22 through a plurality of air holes 50 formed in the combustion tube 29.

Figure 3:
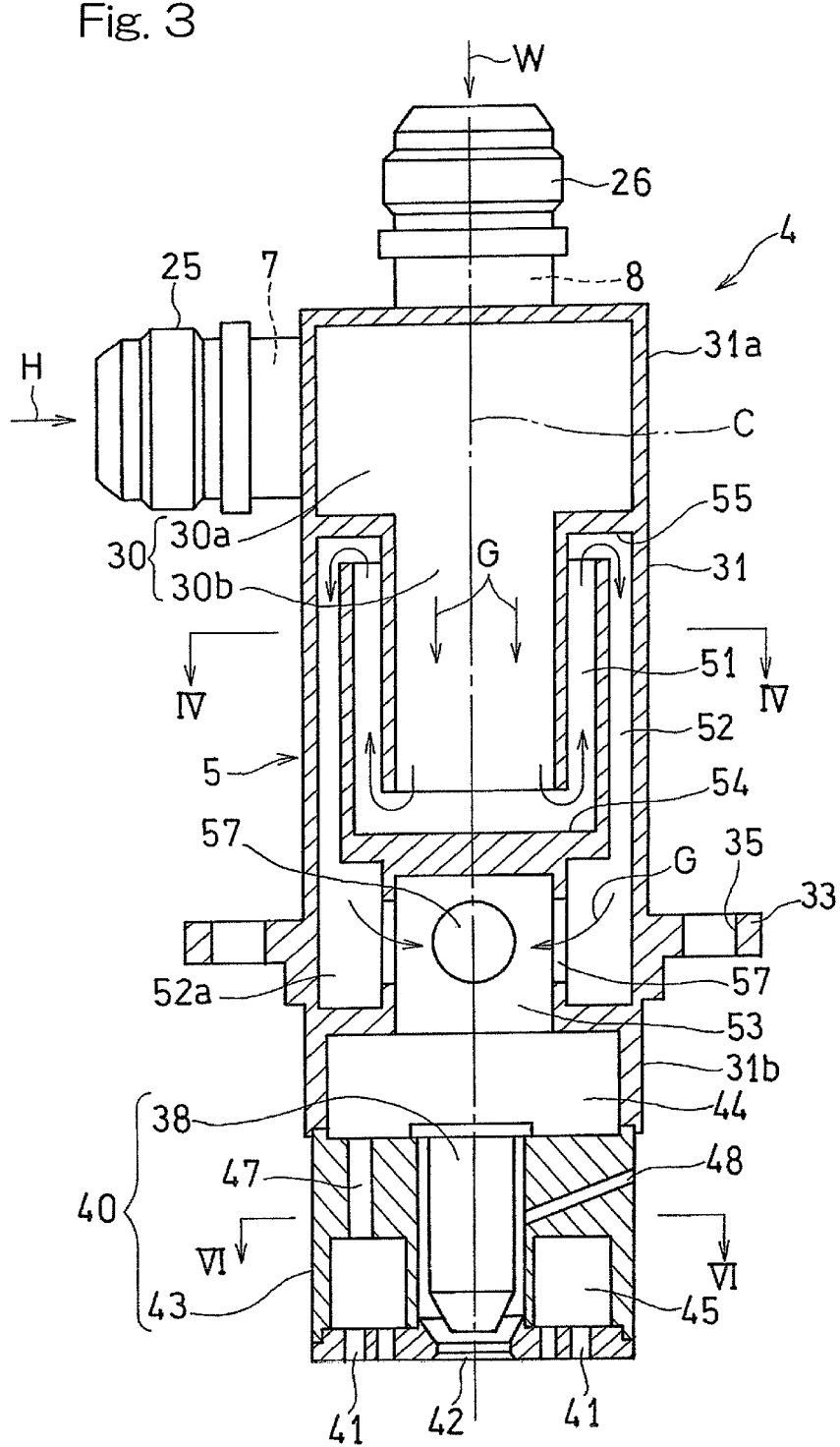
FIG. 3 is a longitudinal cross-sectional view of an internal structure of the fuel injection device.

FIG. 3 shows an internal structure of the fuel injection device 4. As shown in FIG. 3, the fuel nozzle 5 includes a nozzle housing 31 having thereinside a mixing chamber 30 that has a circular transverse cross-section disposed about the axis C, and the first introduction passage 7 and the second introduction passage 8 are connected to the head portion of the nozzle housing 31. The first introduction passage 7 and the second introduction passage 8 are configured to introduce the fuel gas H and the water vapor W, respectively, into the mixing chamber 30 from the outer circumference of the nozzle housing 31 such that the fuel gas H and the water vapor W collide with each other at the angle of 90°. In this way, a first step of mixing of the fuel gas H and the water vapor W is performed in the mixing chamber 30.

A flange 33 is provided on the center portion, in the axial direction, of the nozzle housing 31 on the outer circumference thereof. An insertion hole 35 is formed in the flange 33, and a bolt 36 shown in FIG. 2 is inserted into the insertion hole 35 and screwed into the cover 17, whereby the fuel injection device 4 is supported by the cover 17. The mixing chamber 30 has an upstream portion 30a having a larger diameter and a downstream portion 30b that has a smaller diameter and is concentric with the upstream portion 30a. On the downstream side of the downstream portion 30b, a first reverse passage 51 and a second reverse passage 52 are provided so as to communicate with the downstream end of the mixing chamber 30 and respectively reverse the flow of the mixed gas G from the mixing chamber 30. The first reverse passage 51 is arranged radially outward of the downstream portion 30b of the mixing chamber 30, and is configured to reverse, by causing the mixed gas G to collide with a first collision surface 54 that forms an outer circumferential portion of the bottom surface of the mixing chamber 30, the flow of the mixed gas G toward the upstream side of the mixing chamber 30, that is, toward the head portion of the nozzle housing 31. The second reverse passage 52 is arranged radially outward of the first reverse passage 51, and is configured to reverse, by causing the mixed gas G from the first reverse passage 51 to collide with a second collision surface 55 close to a head portion 31a of the mixing chamber 30, the flow of the mixed gas G toward the downstream side of the mixing chamber 30, that is, toward an end portion 31b of the nozzle housing 31. The downstream portion of the second reverse passage 52 is formed as an expansion portion 52a that expands in the radially inward direction to have an increased passage area.

Figure 4:
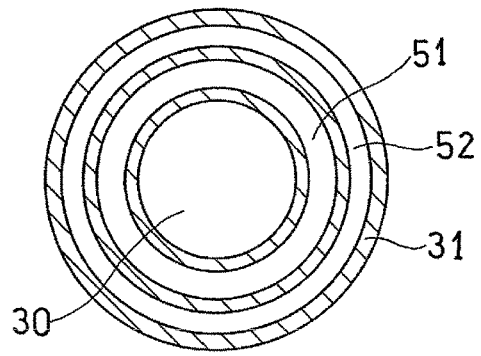
FIG. 4 is a cross-sectional view taken along a line IV-IV shown in FIG. 3.

FIG. 3 shows a case where the two reverse passages 51 and 52 are provided. However, the number of the reverse passages may be three or more. As shown in FIG. 4, the first reverse passage 51 and the second reverse passage 52 are formed, on the inner diametric side of the nozzle housing 31 having a cylindrical cross-section, so as to be concentric with the nozzle housing 31. The downstream portion 30b of the mixing chamber 30 shown in FIG. 3 may be formed as a large diameter portion similar to the upstream portion 30a, and a round-hole-shaped space (hollow portion) may be formed at the center portion of the downstream portion 30b, and a plurality of reverse passages may be formed in the space, that is, may be formed on the radially inner side of the downstream portion 30b. Alternatively, a plurality of reverse passages may be formed on the downstream end of the mixing chamber 30 so as to extend toward the further downstream side in the direction of the axis C.

The end portion 31b of the nozzle housing 31 is provided with a gas injection portion 40 configured to inject the mixed gas G from the mixing chamber 30 into the combustion chamber 22. A mixed gas collection chamber 53 is formed between the gas injection portion 40 and the expansion portion 52a that is a downstream end portion of the second reverse passage 52 arranged at the most downstream side. The mixed gas collection chamber 53 is disposed radially inward of the expansion portion 52a and on the downstream side of the mixing chamber 30. The second reverse passage 52 and the mixed gas collection chamber 53 communicate with each other through a plurality of communication holes 57.

The gas injection portion 40 includes: a pin member 38 of a round-rod-like shape disposed on the axis C of the nozzle housing 31; gas injection holes 41 through which the mixed gas G is injected into the combustion chamber 22 (FIG. 2); an air injection hole 42; and a nozzle block 43 that forms an intermediate header chamber 44 and an end gas header chamber 45 on a side upstream of the gas injection holes 41. The intermediate gas header chamber 44 on the upstream side communicates with the downstream side of the mixed gas collection chamber 53, and stores the mixed gas G. The intermediate gas header chamber 44 and the end gas header chamber 45 on the downstream side are connected to each other through a plurality of communication paths 47 that are arranged in the circumferential direction of the nozzle housing 31, and the gas injection holes 41 communicates directly with the end gas header chamber 45. Among the intermediate chamber 44 and the gas header chamber 45, the intermediate gas header chamber 44 on the upstream side may be omitted.

Figure 6:
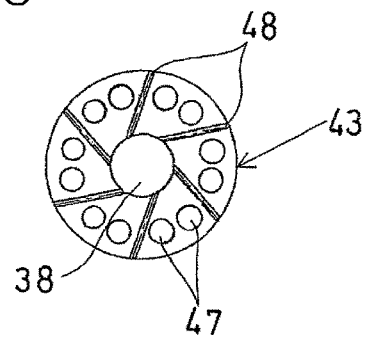
FIG. 6 is a cross-sectional view taken along a line VI-VI shown in FIG. 3.

The nozzle block 43 is formed with a cooling passage 48 through which cooling air is supplied to the outer surface of the pin member 38. The cooling passage 48 communicates with the air passage 24 shown in FIG. 2 to intake thereinto a portion of the compressed air A from the air passage 24, and also communicates with the air injection hole 42 to inject air, which has cooled the pin member 38. As shown in FIG. 6, a plurality (for example, six) of the cooling passages 48 are formed in the nozzle block 43 so as to be tangent to the circumference of the pin member 38 and equally spaced from each other. The communication paths are provided between the cooling passages 48 and 48 adjacent to each other.

Figure 5:
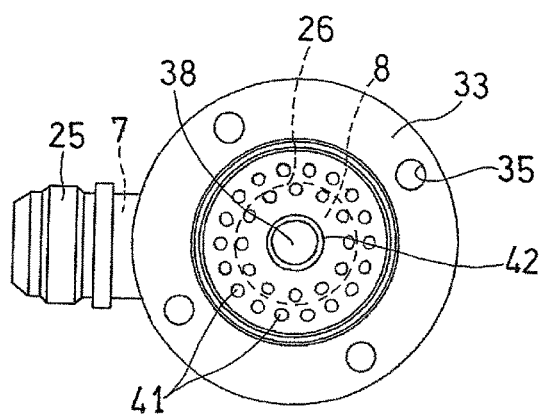
FIG. 5 is a bottom view of the fuel injection device.

FIG. 5 is a bottom view of the fuel injection device 4. A plurality of rows of the gas injection holes 41 are disposed around the air injection hole 42 positioned at the center portion of the fuel nozzle 5 so as to be concentric with each other, and the gas injection holes 41 are equally spaced from each other.

Next, an operation of the fuel injection device will be described. When the gas turbine is actuated, the fuel gas H is compressed by the gas compressor device 13 as shown in FIG. 1, and then introduced into the mixing chamber 30 shown in FIG. 3 through the first introduction passage 7. On the other hand, the water vapor W generated in the boiler 11 shown in FIG. 1 is introduced into the mixing chamber 30 through the second introduction passage 8. The fuel gas H and the water vapor W are introduced into the mixing chamber 30 so as to form an angle of 90°, whereby a first step of mixing is performed.

Subsequently, the mixed gas G is obtained by mixture in the mixing chamber 30, and the flow of the mixed gas G is reversed toward the upstream side of the mixing chamber 30 by the first reverse passage 51 that communicates with the downstream end of the mixing chamber 30 and disposed radially outward of the mixing chamber 30. Further, the flow of the mixed gas G from the first reverse passage 51 is reversed toward the downstream side of the mixing chamber 30 in the second reverse passage 52 disposed radially outward of the first reverse passage 51. When the flow of the mixed gas G is reversed by the first and the second reverse passages 51, 52, the mixed gas G is caused to collide with the first and the second collision surfaces 54, 55, thereby promoting mixing of the mixed gas G.

Thereafter, the mixed gas G from the second reverse passage 52 passes through the communication holes 57, and is collected and stirred in the mixed gas collection chamber 53, thereby promoting the mixing. The mixed gas G from the mixed gas collection chamber 53 enters the intermediate gas header chamber 44, and has its speed reduced to further promote the mixing, passes through the communication paths 47 and then through the end gas header chamber 45, and is injected through the gas injection holes 41 into the combustion chamber 22 shown in FIG. 2.

The fuel gas H and the water vapor W introduced into the mixing chamber 30 is mixed over a longer travel distance for a longer time period as compared to a conventional device. As a result, the fuel gas H and the water vapor W are sufficiently premixed, and a distribution in concentration of the fuel gas H and the water vapor W can be made uniform. The mixed gas G having been injected into the mixing chamber 30 is mixed with the compressed air A having been introduced from the air passage 24 through the swirler 27 and the air introduction holes 50 of the combustion tube 29 into the combustion chamber 22 as shown in FIG. 2, and the combustion thereof is caused. Combustion of the mixed gas G having a uniform distribution in concentration is caused, whereby NOx contained in the exhaust gas discharged from the combustion chamber 22 is reduced. Further, the fuel gas and the water vapor are premixed and then injected, whereby vapor can be effectively injected into combustion region, so that an amount of water vapor to be used can be reduced. Therefore, efficiency is enhanced in the entirety of the gas turbine system. Further, additional equipment such as a mixer for premixing need not be provided, and the fuel injection device also has a simple structure, whereby the device can be produced at low cost.

As shown in FIG. 3, the first reverse passage 51 is arranged radially outward of the mixing chamber 30 and is configured to reverse the flow of the mixed gas G toward the upstream side of the mixing chamber 30, and the second reverse passage 52 is arranged radially outward of the first reverse passage 51 and is configured to reverse the flow of the mixed gas G from the first reverse passage 51 toward the downstream side of the mixing chamber 30. Accordingly, the first reverse passage 51 and the second reverse passage 52 extend in the upstream-downstream direction of the mixing chamber 30 and are overlaid on each other in the radial direction, whereby the structure that includes the mixing chamber 30 and both the reverse passages 51, 52 can be made compact. The first reverse passage 51 and the second reverse passage 52 are formed on the radially outer side of the mixing chamber 30 so as to be overlaid on each other. Therefore, the structure can be made further compact, as compared to a case where the reverse passage that is bent is formed on the radially inner side of the mixing chamber. The structure can be simplified.

The gas injection portion 40 configured to inject, into the combustion chamber 22 (FIG. 2), the mixed gas G from the second reverse passage 52 positioned at the most downstream side is provided at the end portion of the nozzle housing 31. The mixed gas collection chamber 53 is formed between the gas injection portion 40 and the second reverse passage 52 positioned at the most downstream side. Therefore, the mixed gas G from the second reverse passage 52 positioned at the most downstream side is temporarily stored in the mixed gas collection chamber 53, so that the mixed gas G has its speed reduced in the mixed gas collection chamber 53, to further promote mixing of the fuel gas H and the water vapor W.

Since the mixed gas collection chamber 53 is disposed radially inward of the expansion portion 52*a* which is the downstream end portion of the second reverse passage 52 positioned at the most downstream side, a distance to the mixed gas collection chamber 53 from the second reverse passage 52 arranged at the most downstream side and on the radially outer side, is increased, whereby the mixed gas G can be mixed over a longer travel distance for a longer time period. Thus, a distribution in concentration of the fuel gas H and the water vapor W can be effectively made uniform.

The nozzle block 43 of the gas injection portion 40 and the nozzle housing 31 cooperatively forms therebetween the intermediate gas header chamber 44 that communicates with the downstream side of the mixed gas collection chamber 53. Further, the nozzle block 43 includes: the end gas header chamber 45 that communicates with the downstream side of the intermediate gas header chamber 44 through the plurality of communication paths 47; the pin member 38 disposed on the axis of the nozzle housing 31; and the cooling passage 48 configured to supply cooling air to the outer surface of the pin member 38, so that the air injection holes 42 can inject the air, which has cooled the pin member 38, into the combustion chamber 22. Accordingly, the pin member 38 that forms an air passage in the nozzle block 43 is cooled by the air, to prevent thermal damage of the pin member 38 which is heated by flame in the combustion chamber 22.

The first introduction passage 7 is disposed so as to introduce the fuel gas H from the outer circumference of the nozzle housing 31 in the radial direction of the mixing chamber 30, and the second introduction passage 8 is disposed so as to introduce water vapor into the mixing chamber 30 in the direction of the axis C of the nozzle housing 31, so that the fuel gas H and the water vapor W can be introduced into the mixing chamber 30 so as to from an angle of 90°, and the fuel gas H and the water vapor W can collide with each other in the mixing chamber 30. Thus, even before the fuel gas H and the water vapor W reach the reverse passages 51, 52, the fuel gas H and the water vapor W are effectively mixed. The first introduction passage 7 may be connected in the direction of the axis C of the mixing chamber 30, and the second introduction passage 8 may be connected in the radial direction of the mixing chamber 30.

Figure 7:
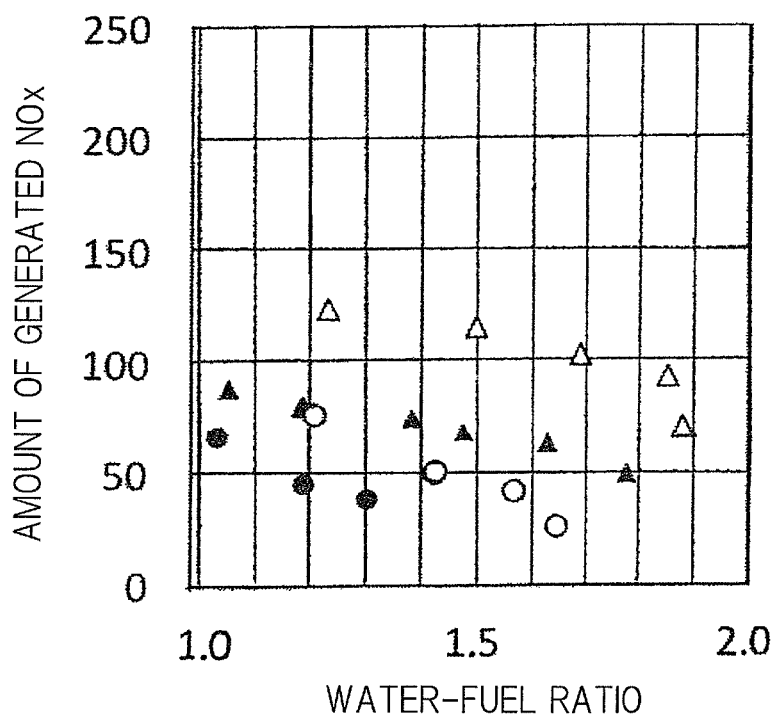
FIG. 7 shows a graph representing an amount of NOx generated in the case of the fuel injection device of the present invention being used, and an amount of NOx generated in the case of a conventional fuel injection device being used, the amounts of NOx being obtained by an experiment.
Figure 8:
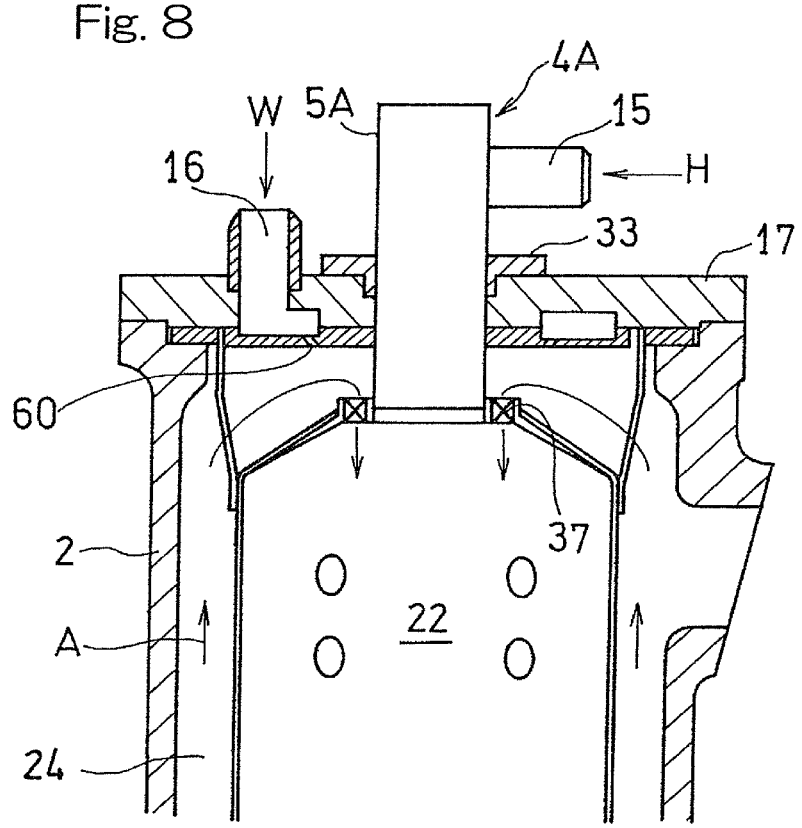
FIG. 8 is a longitudinal cross-sectional view of the conventional fuel injection device used in the experiment shown in FIG. 7.

FIG. 7 shows a NOx reduction effect obtained by the fuel injection device 4 of the present invention. FIG. 7 shows a graph obtained by measuring, in an experiment, an amount of NOx generated in the case of the fuel injection device 4 of the present invention being used, and an amount of NOx generated in the case of a fuel injection device 4A of comparative example being used. FIG. 8 shows a longitudinal cross-section of the fuel injection device 4A used in the experiment. The fuel injection device 4A corresponds to the device disclosed in Patent Document 1. In the fuel injection device 4A, only the fuel gas H is injected from a first introduction passage 15 into a fuel nozzle 5A, and injected from the fuel nozzle 5A into the combustion chamber 22. The water vapor W passes through a second introduction passage 16 that penetrates through the cover 17, and is supplied from a water vapor nozzle 60 through a swirler 37 into the combustion chamber 22. The fuel gas H and the water vapor W are mixed in the combustion chamber 22 only after the fuel gas H and the water vapor W are supplied into the combustion chamber 22. In FIG. 8, the same parts as or parts corresponding to the parts, shown in FIG. 2, of the fuel injection device 4 of the present invention are denoted by the same reference numerals.

In FIG. 7, the black triangle represents an amount of NOx generated in a case where combustion of natural gas and water vapor is caused by the conventional device, the white triangle represents an amount of NOx generated in a case where combustion of hydrogen gas and water vapor is caused by the conventional device, the black circle represents an amount of NOx generated in a case where combustion of natural gas and water vapor is caused by the device of the present invention, and the white circle represents an amount of NOx generated in a case where combustion of hydrogen gas and water vapor is caused by the device of the present invention. It is proved that, in the case where the device of the present invention is used, regardless of whether fuel to which water vapor is added is hydrogen gas or natural gas, generation of NOx tends to be reduced according to a water-fuel ratio that is a weight ratio between water vapor and fuel gas being increased, as compared to the conventional device.

Although the present invention has been fully described in connection with the embodiments thereof with reference to the accompanying drawings, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

GT . . . Gas turbine system
2 . . . Combustor
4 . . . Fuel injection device
5 . . . Fuel nozzle
7 . . . First introduction passage
8 . . . Second introduction passage
22 . . . Combustion chamber
25 . . . First introduction tube
26 . . . Second introduction tube
30 . . . Mixing chamber
31 . . . Nozzle housing
38 . . . Pin member
40 . . . Gas injection portion
41 . . . Gas injection hole
42 . . . Air injection hole
43 . . . Nozzle block
44 . . . Intermediate gas header chamber
45 . . . End gas header chamber
47 . . . Communication path
48 . . . Cooling passage
51 . . . First reverse passage
52 . . . Second reverse passage
53 . . . Mixed gas collection chamber
57 . . . Communication hole

What is claimed is:

1. A fuel injection device, for a gas turbine, that mixes fuel gas and water vapor and injects the fuel gas and the water vapor into a combustion chamber, the fuel injection device comprising:
a nozzle housing having a mixing chamber thereinside;
a first introduction passage configured to introduce the fuel gas into the mixing chamber from an outside of the nozzle housing;
a second introduction passage configured to introduce the water vapor into the mixing chamber from the outside of the nozzle housing; and
a plurality of reverse passages communicating with a downstream end of the mixing chamber and configured to allow for a plurality of reverses of flows of mixed gas from the mixing chamber.

2. The fuel injection device for the gas turbine as claimed in claim 1, wherein the plurality of reverse passages comprises a first reverse passage configured to reverse flow of the mixed gas toward an upstream side of the mixing chamber, and a second reverse passage configured to reverse flow of the mixed gas from the first reverse passage toward a downstream side of the mixing chamber.

3. The fuel injection device for the gas turbine as claimed in claim 2, wherein the first reverse passage is disposed radially outward of the mixing chamber, and the second reverse passage is disposed radially outward of the first reverse passage.

4. The fuel injection device for the gas turbine as claimed in claim 1, the fuel injection device comprising a gas injection portion provided at an end portion of the nozzle housing and configured to inject, into the combustion chamber, the mixed gas from a reverse passage of the plurality of reverse passages arranged at a most downstream side, and a mixed gas collection chamber formed between the gas injection portion and the reverse passage arranged at the most downstream side.

5. The fuel injection device for the gas turbine as claimed in claim 4, wherein the mixed gas collection chamber is disposed radially inward of a downstream end portion of the reverse passage arranged at the most downstream side.

6. The fuel injection device for the gas turbine as claimed in claim 4, wherein
the gas injection portion includes: a gas injection hole configured to inject the mixed gas into the combustion chamber, an air injection hole configured to inject air into the combustion chamber; and a nozzle block,
the nozzle block and the nozzle housing cooperatively form therebetween an intermediate gas header chamber communicating with a downstream side of the mixed gas collection chamber,
the nozzle block has: an end gas header chamber communicating with a downstream side of the intermediate gas header chamber through a plurality of communication paths; a pin member disposed on an axis of the nozzle housing; and a cooling passage configured to supply cooling air to an outer surface of the pin member, and
the air injection hole is configured to inject air, which has cooled the pin member, into the combustion chamber.

7. The fuel injection device for the gas turbine as claimed in claim 1, wherein one of the first introduction passage and the second introduction passage is arranged so as to introduce one of the fuel gas and the water vapor from an outer circumference of the nozzle housing in a radial direction of the mixing chamber, and another of the first introduction passage and the second introduction passage is arranged so as to introduce the other of the fuel gas and the water vapor into the mixing chamber in an axial direction of the nozzle housing.

8. The fuel injection device for the gas turbine as claimed in claim 1, wherein the first introduction passage and the second introduction passage are oriented to form an angle of 90 degrees.

* * * * *